(12) United States Patent
Cami et al.

(10) Patent No.: US 6,274,698 B1
(45) Date of Patent: Aug. 14, 2001

(54) PROCESS FOR PREPARING ASPARTIC ACID FROM AMMONIUM ASPARTATE, AND CONTINUOUS PROCESS FOR PREPARING POLYSUCCINIMIDE INVOLVING SUCH PROCESS

(75) Inventors: Pierre Cami, Languevoisin; Didier Lecomte, Chauny, both of (FR); Aharon Eyal; Aher Vitner, both of Il-Jerusalem (IL)

(73) Assignee: Amylum Europe N.V., Aalst (BE)

( * ) Notice: Subject to any disclaimer, the term of this patent is extended or adjusted under 35 U.S.C. 154(b) by 0 days.

(21) Appl. No.: 09/486,933
(22) PCT Filed: Aug. 19, 1998
(86) PCT No.: PCT/EP98/05268
§ 371 Date: Jun. 8, 2000
§ 102(e) Date: Jun. 8, 2000
(87) PCT Pub. No.: WO99/11603
PCT Pub. Date: Mar. 11, 1999

(51) Int. Cl.$^7$ .................................................. C08G 69/10
(52) U.S. Cl. .......................... 528/328; 528/332; 528/495; 528/497; 528/502 A; 528/503
(58) Field of Search ..................................... 528/495, 497, 528/502 A, 503, 328, 332; 521/64, 65

(56) References Cited

U.S. PATENT DOCUMENTS 5,530,160 * 6/1996 Nore et al. ........................... 562/571

* cited by examiner

Primary Examiner—Duc Truong
(74) Attorney, Agent, or Firm—Maria Parrish Tungol

(57) ABSTRACT

The invention relates to a process for the preparation of aspartic acid by decomposition of ammonium aspartate wherein a concentrated aqueous solution of ammonium aspartate is continuously introduced into a diluent in which water has a low solubility, which diluent is maintained at a temperature at which ammonium aspartate decomposes into aspartic acid and ammonia, and wherein the water and the formed ammonia are continuously removed. The invention also relates to a process for preparing polysuccinimide starting from fumaric acid or maleic acid and ammonia involving said process for preparing aspartic acid from ammonium aspartate.

25 Claims, 2 Drawing Sheets

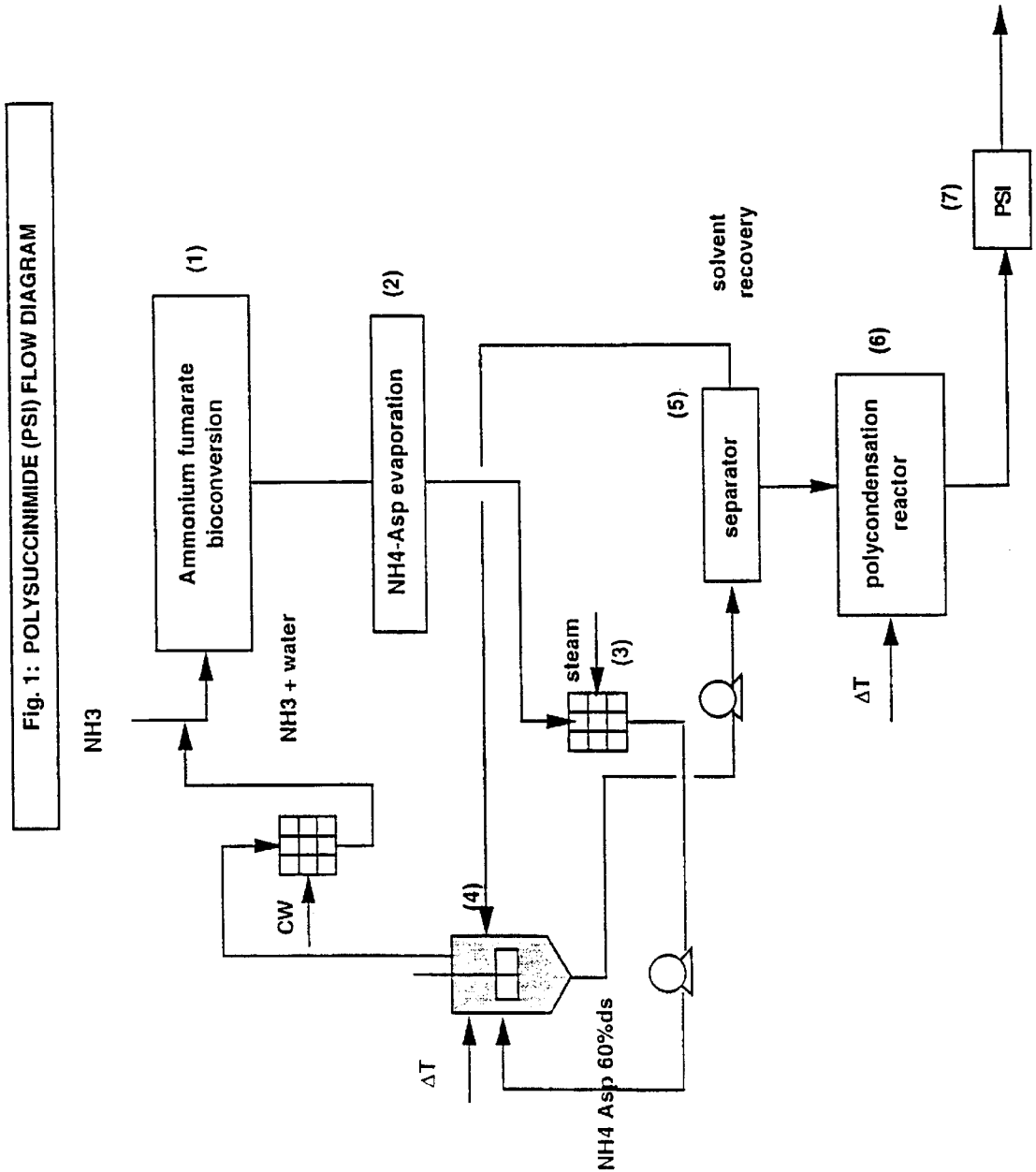

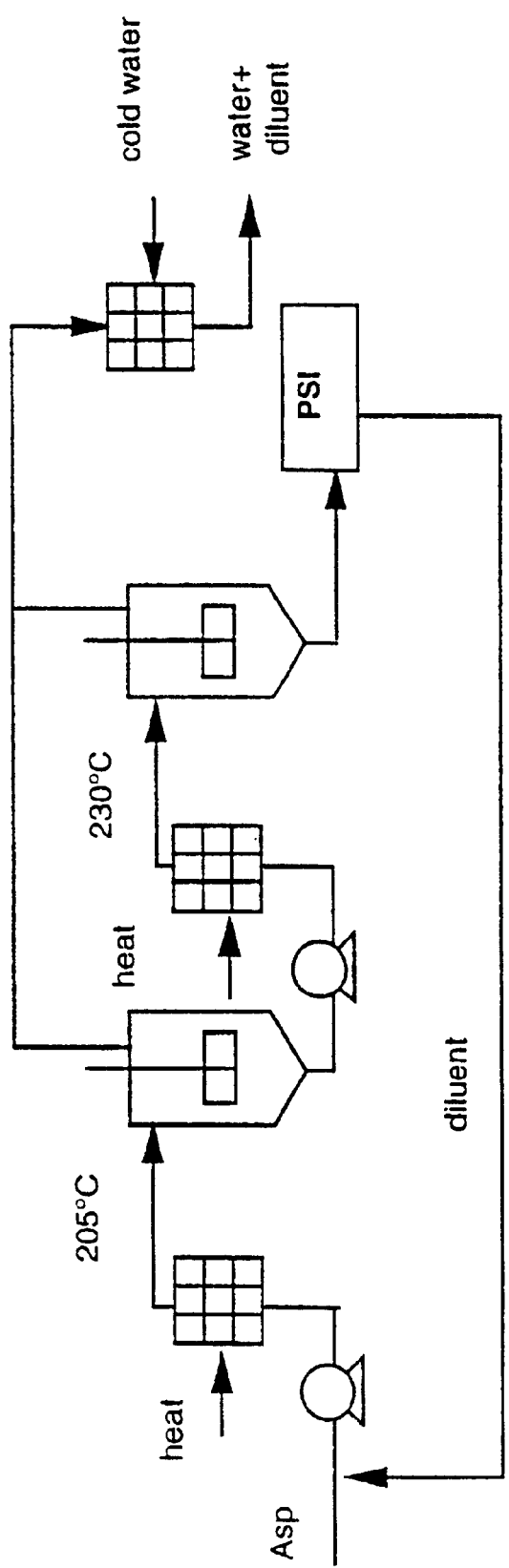
Fig 2: CONTINUOUS POLYCONDENSATION REACTOR

PROCESS FOR PREPARING ASPARTIC ACID FROM AMMONIUM ASPARTATE, AND CONTINUOUS PROCESS FOR PREPARING POLYSUCCINIMIDE INVOLVING SUCH PROCESS This invention relates to a (continuous) process for the transformation of ammonium aspartate into aspartic acid, and to a continuous process for the production of polysuccinimide by a polycondensation step of ammonium aspartate thus obtained.

According to the state of the art, two major routes exist to prepare polysuccinimide the polycondensation of maleic anhydride with ammonia, resulting in a polycondensate composed of D- and L-anhydroaspartimide building blocks. Typical examples of this process are described in a.o. EP 256366, EP 578451, U.S. Pat. No. 5,410,017 or EP 612784.

the polycondensation of aspartic acid or precursors thereof, such as ammonium aspartate. This reaction is performed with or without catalyst addition. Typical examples of this process are described in a.o. U.S. Pat. No. 3,846,380, EP 406623, U.S. Pat. No. 5,219,986, WO 9214753, or EP 578448.

Polysuccinimide is used as a starting material for the production of polyaspartic acid, which finds application a.o. as Ca scavengers in detergents.

When using maleic anhydride as the starting compound, a D,L-polyaspartic acid is obtained after the alkaline hydrolysis of the corresponding polysuccinimide. This polycondensate has a less good biodegradability than the polycondensates of L-aspartic acid.

The L-aspartic acid used in the preparation of L-polyaspartic acid is obtained via the bioconversion of fumaric or maleic acid, or salts thereof. During these bioconversion reactions ammonium fumarate is contacted with an aspartame enzyme system, while ammonium maleate is contacted with a maleate isomerase/aspartase enzyme system. These transformations can be conducted in batch or continuously. A continuous process is e.g. described in GB 2084155, EP 89165 or DE 2835874, where ammonium fumarate is reacted over a column containing an immobilised aspartase-producing micro-organism. The resulting ammonium aspartate solution can then be transformed into an aspartic acid solution followed by the crystallisation of the corresponding acid.

Several methods are described for the recovery of crystalline aspartic acid. The standard method for obtaining crystalline aspartic acid comprises the addition of sulfuric acid to the ammonium aspartate solution. This method allows the formation of ammonium sulfate and aspartic acid. After crystallisation of the aspartic acid the ammonium sulfate residue is recovered and used as fertiliser.

Another method for recovering aspartic acid is described in EP 588674 and consists in the addition of fumaric acid to the ammonium aspartate solution. The major advantage of this method resides in the fact that no by-product is formed because ammonia is recovered as ammonium fumarate when using fumaric acid as the neutralising agent.

The major disadvantage of this method resides in the fact that the transformation of ammonium aspartate into ammonium fumarate is time consuming and discontirnous.

An improvement of the above process is described in EP 678499. This application describes the use of an alcoholic solution of fumaric acid which is added to an ammonium aspartate solution. The formation of aspartic acid crystals indeed takes less time but a residual solution of ammonium fumarate in aqueous alcohol is obtained. The alcohol, such as ethanol or methanol, must first be removed before the ammonium fumarate solution can be further processed to ammonium aspartate.

A further method for obtaining aspartic acid out of ammonium aspartate is described in JP 07/330696. Here the ammonium aspartate solution is heated which results in the decomposition of the ammonium salt into aspartic acid and ammonia, which is evaporated together with the water. This method is quite energy consuming (because hot water has to be supplied continuously and then evaporated) while the ammonium aspartate is not completely converted into aspartic acid.

The conversion of ammonium aspartate into polysuccinimide is for instance described in DE 4429108. This patent application discloses the formation of polysuccinimide by evaporating a solution of ammonium aspartate at 80° C. to dry, followed by a 4 hour heat treatment at 180–220° C. During this heating a foam is produced which is milled to a fine powder. This powder is then further polycondensed to the final polysuccinimide.

Continuous methods for preparing polysuccinimide from aspartic acid, with or without catalyst are described in e.g. U.S. Pat. No. 5,449,748, WO 9605241, EP 646615 and EP 578449.

From the prior art it can thus be concluded that a continuous transformation of fumarate into aspartate is known, and also a continuous transformation of aspartic acid into polysuccinimide. A continuous transformation of ammonium aspartate into aspartic acid would therefore be very interesting because then a continuous process for obtaining polysuccinimide out of fumaric acid would become possible.

Applicants have now succeeded in the development of a continuous process for preparing aspartic acid from ammonium aspartate and hence for preparing polysuccinimide out of fumaric acid or maleic acid.

The invention thus specifically relates to a process for the (continuous) preparation of aspartic acid by decomposition of ammonium aspartate, in which a concentrated aqueous solution of ammonium aspartate is constantly introduced into a diluent in which water has a low solubility, which diluent is maintained at a temperature at which ammonium aspartate decomposes into aspartic acid and ammonia and in which the water and the formed ammonia and aspartic acid are continuously removed, preferably at a rate substantially corresponding to the rate of introducing the ammonium aspartate solution into the diluent.

According to a preferred feature of the invention the aqueous solution has a concentration of at least 25% by weight of ammonium aspartate. More concentrated solutions, in particular solutions with at least 50% (such as 50–60%) by weight of ammonium aspartate are more economical and therefore prefered.

According to another preferred aspect of the invention the solubility of water in the used diluent is less than 2% by weight, preferably less than 1%. Its temperature is appropriately maintained at a temperature above 130° C., preferably between 130 and 160° C., most preferably between 140 and 150° C.

In selecting the diluent, preference is to be given to those having a boiling point of at least 165° C., preferably between 190 and 300° C. Particularly suitable classes of solvents are higher alcohols, higher aliphatic hydrocarbons, higher aromatic hydrocarbons, higher alkyl ethers and high boiling aromatic ethers.

Preferred diluents are decanol, dodecanol, decaline, tetraline, and phenyl linear or branched $C_{10}$–$C_{20}$-alkanes.

According to a further preferred feature of the invention the rate of introduction of the aqueous ammonium aspartate solution and/or the rate of removal of the water, ammonia and aspartic acid is such that the formation of a twoliquid phase system is prevented.

According to still another preferred feature of the invention the content of aspartic acid crystals in the reaction medium during the continuous process is at least 10% by weight of the amount of diluent used.

The invention also specifically relates to a continuous process for preparing polysuccinimide starting from fumaric or maleic acid and ammonia, involving the said continuous process for preparing aspartic acid from ammonium aspartate.

This continuous process for preparing polysuccinimide according to the invention comprises the following process steps:

reaction of fumaric or maleic acid with ammonia to prepare ammonium fumarate or maleate,
continuous bioconversion of the ammonium fumarate or ammonium maleate respectively into an aqueous ammonium aspartate solution, using immobilised aspartase or fumarate isomerase/aspartase respectively containing micro-organisms,
concentrating the aqueous solution,
continuously introducing the concentrated aqueous solution of ammonium aspartate into a diluent in which water has a low solubility, which diluent is maintained at a temperature at which ammonium aspartate decomposes into aspartic acid and ammonia,
continuously removing water and the formed ammonia and aspartic acid at a rate substantially corresponding to the rate of introducing the ammonium aspartate solution into the diluent, whereas the ammonia is recovered for use in the conversion of fumaric or maleic acid into ammonium fumarate or maleate,
thermal polycondensation of the obtained aspartic acid into polysuccinimide.

It is supposed that when introducing the concentrated ammonium aspartate into the heated diluent, the water present immediately dissolves in the diluent while the ammonium aspartate solidifies. The temperature at which the concentrated ammonium aspartate solution is introduced into the diluent is high enough to allow the decomposition of the ammonium salt into ammonia and aspartic acid. The ammonia together with the water is continuously removed at a speed which is about equal to the speed with which water is added to the diluent when feeding with concentrated ammonium aspartate. The ammonia-solution thus obtained is used to neutralise fumaric acid or maleic acid used as starting product for the bioconversion step.

As indicated above diluents used in the processes according to the invention are characterised in that the solubility of water in them is below 2%, preferably below 1% W/W. The reaction temperature at which ammonium aspartate is decomposed is between 130 and 160° C., preferably between 140 and 150° C.

It is essential that no two-phase system of liquids is formed during the decomposition of ammonium aspartate. If excess water is not removed fast enough, then a highly concentrated ammonium aspartate melt phase is formed which causes problems of agglomerating, of further dewatering and incomplete decomposition of the ammonium aspartate. The aspartic acid obtained under such conditions is more difficult to transform into the polysuccinimide polycondensate.

The diluents used in the decomposition of ammonium aspartate do have a boiling point of at least 165° C. More preferably, the boiling point of the diluent is situated between 190° C. and 300° C.

Typical diluents which can be used are higher alcohols, higher aliphatic hydrocarbons, higher aromatic hydrocarbons, higher alkyl ethers, high boiling aromatic ethers etc.

Among the higher alcohols, C8–C14-alcohols can be used, decanol and dodecanol being preferred. Suitable higher aliphatic hydrocarbons are e.g. C10–C20-hydrocarbons, decaline or tetraline, while among the higher aromatic hydrocarbons phenyl linear or branched higher alkanes can be used.

The above mentioned diluents are preferably substanstially free of water at the moment that the reaction is started.

The process according to the invention is schematically described having reference to FIG. 1.

In a first step fumaric acid (respectively maleic acid) is neutralised with fresh ammonia and/or ammonia recovered from the decomposition step. The thus obtained ammonium fumarate solution (respectively ammonium maleate solution) is then continuously fed to a reactor (1) in which an aspartase containing micro-organism is immobilised on an inert carrier. The ammonium aspartate solution is then continously concentrated by means of evaporation means to an aqueous solution of at least 50% d.s., preferably at least 60% d.s. (2).

Falling film evaporators, Multiple Vapour Recompression (MVR) evaporators or multistep-evaporators are particularly suited for this concentration step.

This concentrated ammonium aspartate stream is then continuously pumped into the reaction vessel (4). Before introduction to the reaction vessel, the concentrate can be heated to about 100° C. via a steam heated heat exchanger (3).

The reaction vessel (4) comprises a diluent which is free of dissolved water and of which the temperature is constantly held at 130°–160° C., preferably at 140°–150° C. The concentrated ammonium asparate is now continuously fed to the diluent at a rate sufficiently low to prevent the formation of a two-phase liquid system Under these conditions, the ammonium aspartate decomposes into ammonia and the corresponding acid, while water and ammonia are continuously removed.

The process can be carried out under normal pressure but may also be performed under reduced or encreased pressure.

The aspartic acid formed is continuously removed at a rate corresponding with the quantity of ammonium aspartate fed. The total quantity of aspartic acid present in the reaction vessel (4) is preferably at least 10% by weight with respect to the amount of diluent used. When starting the continuous process this amount of aspartic acid cristals is preferably pre-introduced in the reaction vessel.

The decomposition of the ammonium aspartate into aspartic acid and ammonia can also be performed in a cascade type of reactor.

From the reaction vessel (4) a stream of aspartic acid crystals is continuously removed and separated from the diluent in a separation device (5). The diluent recovered during this separation step is recirculated to the reaction vessel (4). Separation devices which can be used here are e.g. rotating vacuum filters, continuous belt filters, centrifuges, decanters, hydrocyclones etc . . . .

The separated aspartic acid crystals are then continuously dispersed into a diluent which is heated to at least 180° C. Here the return from the polysuccinimide separation step (7) is very suitable for that purpose. The dispersion of aspartic acid crystals in the diluent is then transferred in a polycondensation reactor (6).

The polycondensation step can be performed in one step but a multistep cascade process is preferred.

A possible polycondensation reactor is shown in FIG. 2. This installation comprises two reaction vessels A and B which are both heated at different temperatures. Both the reaction vessels are continuously fed and are working in cascade. Condensation water is continuously removed and condensed in e.g. a heat exchanger. From the outlet of reactor B, polysuccinimide, dispersed in diluent, is continuously removed at a rate corresponding to the feeding rate of reactor A.

Reactor A is preferably heated to a temperature of at least 200° C. Reactor B has a temperature which is at least 20° C. above the temperature in reactor A.

The polysuccinimide is separated from the diluent and can them be further processed into polyaspartic acid using the generally known methods. The diluent is used to disperse the aspartic acid which is fed to reactor A.

The cascade process as described in FIG. 2 should be considered as the illustration of a principle. Also installations comprising three of more reactors in cascade can be used for that purpose. The difference in reaction temperature between the first reactor and the last one is preferably at least 30° C.

EXAMPLE 1

In a 1 liter stirred reactor equipped with a rectification column and cooler, a mixture of 50 g of aspartic acid crystals in 417 g of decanol was heated to about 150° C. Then a solution of ammonium aspartate (60% W/W) was added dropwise with heating to keep the temperature between 145° C. and 150° C. Meanwhile, water and ammonia were recovered at the outlet of the cooler, together with some solvent.

After 128 g of solution was added was added to the decanol suspension, suddenly a sticky mass appeared. Addition of some 80 g of aspartic acid crystals restored the solid suspension. The mixture was further heated to remove some residual water and ammonia.

The aspartic acid crystals were removed by vacuum filtration. After washing with ethanol and water 186 g of aspartic acid crystals were obtained with 94% purity (polarimetric assay).

EXAMPLE 2

In the same experimental device as in Example 1, 415 g of decanol and 77 g of aspartic acid crystals were heated to about 150° C. Then a solution of ammonium aspartate (obtained by bioconversion of ammonium fumarate using Pseudomonas fluorescens), containing 27% W/W of ammonium aspartate, was added dropwise to the mixture.

The suspension remained homogeneous untill the end of the reaction. Using the same procedure as above, aspartic acid crystals were obtained with 986 purity.

EXAMPLE 3

The same trial as in example 2 was reproduced, except that the ammonium aspartate solution was concentrated to 56% W/W, prior to the addition to the decanol aspartic acid mixture.

The suspension remained homogeneous until the end of the reaction. The reaction was stopped after that 148 g of solution was added. Separation and washing was performed as above.

EXAMPLE 4

A 5 l reaction vessel was equipped with a stirrer, an inlet for the continuous feeding of aqueous ammonium aspartate, an inlet for decanol addition, a rectification column and cooler, and an outlet to remove decanol aspartic acid suspension.

In the 5 l reactor 300 g aspartic acid crystals were dispersed in 3 l of dry decanol. This mixture was then heated under stirring up to 150° C. When this temperature was reached, continuous addition of concentrated preheated ammonium aspartate solution (60% W/W) was started. After about 200 g of the concentrated solution was added, removal of aspartic acid was started. This was done discontinuously, every time that an additional 100 g of ammonium aspartate solution was added. This ammonium aspartate solution was added at a rate of 4 g/min. The decanol aspartic acid suspension was filtered and the decanol returned to the reaction vessel. The thus obtained aspartic acid was further converted into polysuccinimide in a separate reactor.

EXAMPLE 5

In a 500 ml vessel equipped with stirrer, rectification column and cooler, 50 g of aspartic acid, obtained from example 3, was heated in decanol until a constant temperature of 235° C. was reached.

Water evolution started at 210° C., the colour of the crystals turned from white to pink, then salmon orange with completion of the reaction.

The reaction mixture was then cooled to 60–70° C. and crystals of polysuccinimide removed by filtration. About 35 g of solid was recovered. Nitrogen content of the solid was 13.7%. In theory nitrogen content of polysuccinimide= 14.2% and of aspartic acid=10.4%.

EXAMPLE 6

Example 4 was repeated with 150 g of aspartic acid instead of 50 g. About 150 g of polysuccinimide was recovered having a nitrogen content of 14.5%.

What is claimed is:

1. Process for the preparation of aspartic acid by decomposition of ammonium aspartate, characterised in that a concentrated aqueous solution of ammonium aspartate is constantly introduced into a diluent in which water has a solubility of less than 2% by weight, which diluent is maintained at a temperature at which ammonium aspartate decomposes into aspartic acid and ammonia, and in that the water and the formed ammonia are continuously removed.

2. Process according to claim 1, characterised in that the aqueous solution has a concentration of at least 25% by weight of ammonium aspartate.

3. Process according to claim 1 wherein the solubility of water in the used diluent is less than 2% by weight.

4. Process according to claim 1 wherein the solubility of water in the used diluent is less than 1%.

5. Process according to claim 1 wherein the diluent is maintained at a temperature above 130° C.

6. Process according to claim 1 wherein the diluent is maintained at a temperature between 130 and 160° C.

7. Process according to claim 1 wherein the diluent is maintained at a temperature between 140 and 150° C.

8. Process according to claim 1 wherein the diluent has a boiling point of at least 165° C.

9. Process according to claim 1 wherein the diluent has a boiling point of between 190 and 300° C.

10. Process according to claim 1 wherein the diluent is selected from higher alcohols, higher aliphatic hydrocarbons, higher aromatic hydrocarbons, higher alkyl ethers and high boiling aromatic ethers.

11. Process according to claim 1 wherein the diluent is selected from decanol, dodecanol, decaline, tetraline, and phenyl linear or branched $C_{10}$–$C_{20}$ alkanes.

12. Process according to claim 1 wherein the rate of introduction of the aqueous ammonium asparate solution and/or the rate of removal of the water, ammonia and aspartic acid is such that the formation of a two-phase system of two liquids is prevented.

13. Process according to claim 1 wherein the content of aspartic acid crystals in the reaction medium during the continuous process is at least 10% by weight of the amount of diluent used.

14. Continuous process for preparing polysuccinimide starting from fumaric or maleic acid and ammonia, characterised by the following process steps:

reaction of fumaric or maleic acid, or salts thereof, with ammonia to prepare ammonium fumarate or maleate, continuous bioconversion of the ammonium fumarate or ammonium maleate respectively into an aqueous ammonium aspartate solution, using immobilised aspartase or fumarate isomerase/aspartase respectively containing micro-organisms, concentrating the aqueous solution, continuously introducing the concentrated aqueous solution of ammonium aspartate into a diluent in which water has a solubility of less than 2% by weight, which diluent is maintained at a temperature at which ammonium aspartate decomposes into aspartic acid and ammonia, continuously removing water and the formed ammonia and aspartic acid at a rate substantially corresponding to the rate of introducing the ammonium aspartate solution into the diluent, whereas the ammonia is recovered for use in the conversion of fumaric or maleic acid into ammonium fumarate or maleate, thermal polycondensation of the obtained aspartic acid into polysuccinimide.

15. Process according to claim 14, wherein the solubility of water in the diluent is less than 2% by weight.

16. Process according to claim 14, wherein the solubility of water in the diluent is less than 1%.

17. Process according to claim 14, wherein the diluent is maintained at a temperature above 130° C.

18. Process according to claim 14, wherein the diluent is maintained at a temperature between 130 and 160° C.

19. Process according to claim 14, wherein the diluent is maintained at a temperature between 140 and 150° C.

20. Process according to claim 14, wherein the diluent has a boiling point of at least 165° C.

21. Process according to claim 14, wherein the diluent has a boiling point between 190 and 300° C.

22. Process according to claim 14, wherein the diluent is selected from the group consisting of higher alcohols, higher aliphatic hydrocarbons, higher aromatic hydrocarbons, higher alkyl ethers and high boiling aromatic ethers.

23. Process according to claim 14, wherein the diluent is selected from the group consisting of the diluent is selected from decanol, dodecanol, decaline, tetraline, and phenyl linear or branched $C_{10}$–$C_{20}$ alkanes.

24. Process according to claim 14, wherein the rate of introduction of the aqueous ammonium aspartate solution and/or the rate of removal of the water, ammonia and aspartic acid is such that the formation of a two-phase system of two liquids is prevented.

25. Process according to claim 14, wherein the content of aspartic acid crystals in the reaction medium during the continuous process is at least 10% by weight of the amount of diluent used.

* * * * *